Figure 6:
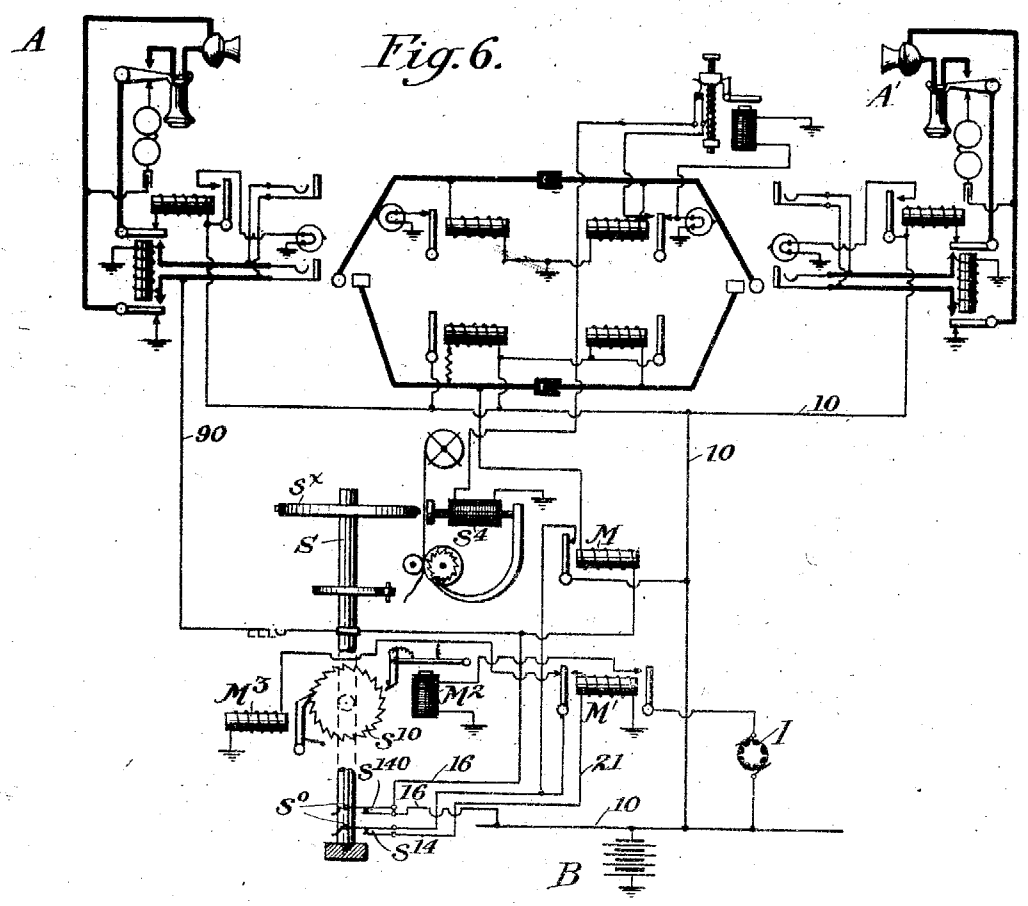

E. E. CLEMENT.
TELEPHONE EXCHANGE SYSTEM.
APPLICATION FILED MAR. 25, 1912.
Reissued July 21, 1914.
13,776.
2 SHEETS—SHEET 1.
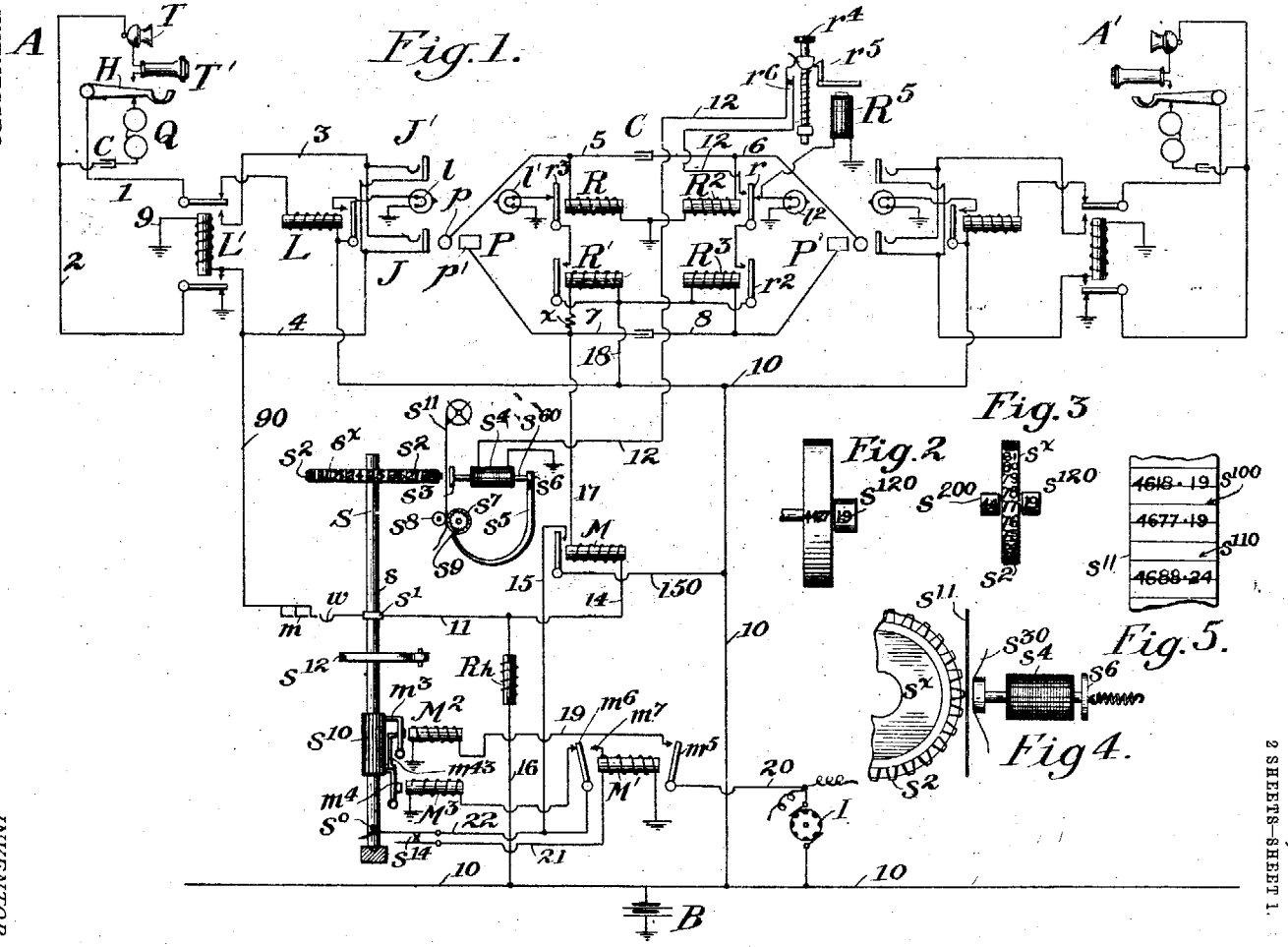
WITNESSES
T. Parkes
H. H. Fowler
INVENTOR
Edward E. Clement
Attorney

E. E. CLEMENT.

TELEPHONE EXCHANGE SYSTEM.

APPLICATION FILED MAR. 25, 1912.

Reissued July 21, 1914.

13,776.

2 SHEETS—SHEET 2.

WITNESSES

T. P. Barbour

H. H. Lowenstein

INVENTOR

Edward E. Clement

Attorney

UNITED STATES PATENT OFFICE.

EDWARD E. CLEMENT, OF WASHINGTON, DISTRICT OF COLUMBIA, ASSIGNOR TO THE TELEPHONE IMPROVEMENT COMPANY, OF ATTICA, NEW YORK, A CORPORATION OF NEW YORK.

TELEPHONE-EXCHANGE SYSTEM.

13,776. Specification of Reissued Letters Patent. Reissued July 21, 1914.

Original No. 956,484, dated April 26, 1910, Serial No. 249,021. Application for reissue filed March 25, 1912. Serial No. 686,217.

*To all whom it may concern:*

Be it known that I, EDWARD E. CLEMENT, a citizen of the United States, residing at Washington, in the District of Columbia, have invented certain new and useful Improvements in Telephone-Exchange Systems, of which the following is a specification, reference being had therein to the accompanying drawings.

My invention relates to telephone exchange systems, and particularly to call registering means as applied to such systems.

It has for its object the provision of means located at the central office for recording calls and charging them to the lines calling, using a set of registers or recorders in number less than the total number of lines served.

Other objects are to identify the particular operator and the particular connective apparatus, cord-circuit, etc., used in the answering of any particular call, to make the operation automatic in that it requires no attention on the part of the operator, to register on a "recall", and where desired to register the duration of a call. The construction and arrangement are such that lines may be redistributed at the intermediate frame of a multiple-board without confusion in the registers, and only as many of the latter need be employed as the business calls for. The scheme is strictly applicable to any common battery telephone exchange in which cut-off relays and supervisory relays are employed, and to almost all others now in use. It may also be applied to systems of the "semi-automatic" type, and to full automatic installations, in every case without disturbing or changing the standard connections or mechanism.

Briefly stated my invention comprises an automatic selector switch for each cord-circuit, or which may be connected to any cord-circuit, a tap being taken off an indifferent point identified with each line-circuit in the particular position to which the cords belong and carried to the corresponding multiple contacts in each of the selector switches of that position. Each switch is preferably connected up so that its controlling magnet is in the bridge wire of a Wheatstone bridge, whose several arms are made up of the battery connections to the cord-circuit, and when an answering plug is in a jack, of the connected parts of the cord and line. When a plug is inserted in answer to a call, current is admitted to the controlling magnet of the selector switch, which starts around and moves until its wiper contact has selected and made contact with the multiple in its banks of the line calling; the bridge is then short circuited and the switch stops. As the switch spindle turns it moves a type wheel carrying printing type or punches, and when it stops a number or punch on said wheel corresponding to the line selected is brought into recording position opposite a tape or card. When the called subscriber finally answers, his supervisory relay closes the circuit of a printing or punching magnet, which presses the tape or card against the wheel and so records the number or other designating character of the line calling. When the subscribers hang up the tape or card is fed out, and when the answering plug is finally removed the restoring magnet of the switch gets current and the switch returns to normal position ready for a fresh operation.

In its broadest aspect, my invention relates to those registering systems employing a number of registers less than the number of lines to be served, and although I have chosen to use a Wheatstone bridge for convenience, I can employ various circuits, the underlying principle being susceptible of many and varied embodiments. This principle is that any line calling may be identified if some portion of its individualized apparatus or circuit is represented and accessible in a selector, provided that the condition of this portion is different when the line is in use from its condition when the line is idle.

My invention is illustrated in the accompanying drawings, wherein:—

Figure 1 is a diagram showing two subscribers' line circuits and a central office connecting circuit, with a register attached thereto. Figs. 2, 3 and 4 are details of the type wheel and attachments. Fig. 5 shows a piece of the tape. Fig. 6 is a modification of the circuits shown in Fig. 1.

Referring to Fig. 1, A and A′ are two subscribers' stations shown as connected to a multiple switchboard wired up in accordance with a well known standard scheme of "two-wire multiple". Each sub-station is equipped with the usual transmitter T, receiver T′, switch-hook H, ringer Q, and condenser C. The line-wires 1—2 extend from the sub-station to the contacts of the cut-off relay L′, whence they are normally extended, the first to line-relay L and battery, and the second to ground. When L′ is energized the line is extended through wires 3—4 to the contacts of its answering jack J and its multiple J′. The cord-circuit is separated by condensers C, C, the answering plug P and the calling plug P′ having their tips $p$ and their sleeves $p'$ connected through the strands 5—6 and 7—8. Bridged across each end of the cord is a pair of relays, R—R′ or $R^2$—$R^3$, which jointly control the supervisory lamp $l'$ or $l^2$.

All of the arrangement so far described is old and well known, having been largely used in common battery installations. I have shown my invention in connection with this because it happens to be a convenient system to illustrate; but I do not wish to be limited thereby; nor am I limited in practice to any particular type of system. My invention can be used with a magneto system, as I shall point out hereafter, and is well adapted for any of the common battery systems now known and used, as I have already stated.

The type of switch I have chosen to illustrate is that employed quite commonly in automatic exchange systems according to present practice. Its essential features are a spindle carrying a contact wiper and rotating to move said wiper over a series of fixed contacts arranged in an arc having greater or smaller angular dimensions according to the number of contacts. This arc with its contacts is called the "bank" or "contact bank." The spindle is rotated by means of a ratchet wheel on it and a pawl vibrated by an electro-magnet, premature retraction being prevented by a retaining pawl controlled by another electro-magnet, which when it is energized lifts both pawls away from the ratchet so that a suitable coiled spring can return the spindle back to zero or its normal position. I add to this a type-wheel mounted on the spindle and fixed so that when the wiper rests upon any particular line contact the number of that line on the type-wheel will be opposite the tape. Referring to Fig. 1, S is the selector switch, having a spindle $s$, which I have shown mounted for revolution in a foot step but which may and preferably will be in practice horizontal. On this spindle is secured the collar $s'$, insulated therefrom and carrying the wiper $w$, which is a metal, (usually a German silver) arm extending out radially so as to sweep over a circle as the spindle rotates. On the lower part of the spindle is mounted rigidly a ratchet $s^{10}$, by means of which it is turned, and below this is a horizontally projecting pin or stud $s^0$, which when the spindle is in its idle position engages a spring couple $s^{14}$ to close the circuit of the starting relay. Above the ratchet I have shown a retracting spring $s^{12}$, having one end of its coil secured to the spindle and the other to a fixed point. At the upper end of the spindle is a type wheel $s^x$, bearing on its periphery type numbers or characters raised in relief, as indicated at $s^2$, there being a number or character on the wheel corresponding to each line having a multiple contact in the bank swept over by the wiper $w$. Opposite the type wheel is a printing magnet $s^4$, shown as a solenoid magnet with an iron shell and a central plunger carrying the armature $s^6$ at one end and the printing platen $s^3$ at the other. Between the latter and the type wheel lies the tape $s^{11}$, fed from a roll or spider as shown above the wheel, down between the friction or feed rolls $s^7$—$s^8$. The feed of this tape is governed by the printing magnet. As I have illustrated it for simplicity, this is by means of a spring extension arm $s^5$ attached to the armature and provided with a hook or toe that takes into teeth on the periphery of the feed wheel $s^7$. This may work in either of two ways, both of which would be well enough represented by the diagrammatic showing. First, it may be that the toe $s^9$ when the armature $s^6$ is retracted will pull the wheel $s^7$ around several teeth, depending on the length of the air-gap allowed the magnet $s^4$, thus feeding the tape a space after the number is printed each time; or second, the toe $s^9$ may be merely a detent adapted to normally hold the wheel $s^7$ against rotation and to release the same upon the energization of the magnet $s^4$, and the shaft or arbor of wheel $s^7$ be driven shaft, that is provided with a motor as clock-work, the speed of the shaft's rotation upon release being predetermined and constant. In this case after the printing magnet has done its work and the momentum of the printing platen is spent, so as to free the tape from pressure, the latter will be continuously fed until the printing circuit 12 is broken at the end of the conversation, the length of tape fed being thus the measure of the elapsed time after the number was stamped, and furnishing means for getting totals of time-use of subscribers' lines.

The circuits of my switch are simple. The main battery bus 10 is tapped by wires 16 and 18, the latter containing the supervisory control relay R′ and the former the inductive resistance R$h$. These two wires form the two right arms of the bridge. The cord strand 7 from the point of connection of the supervisory relay R′ to the plug sleeve $p'$, with the jack thimble and wire 4, form the upper left arm; and as will be obvious from the diagram these are common parts of the usual circuits. The fourth arm of the bridge, on which I depend for differentiating the circuit calling, is marked 11—90, 11 being the switch end of the arm, and 90 a branch of the wire tap 9 from wire 4 through the cut-off relay L′ to ground. I take this tap 90 off between the cut-off relay and the jack for a particular reason which will be explained in connection with the statement of operation. The bridge wire of the bridge thus formed is 14—17, and includes the relay magnet M, which I shall refer to as the controlling relay. It determines the movement of the switch, according to the condition of the bridge. Coöperating with it is a relay M′ for the stepping and release magnets $M^2$ and $M^3$. In its initial operation this relay M′ is a starting relay, and thereafter a release relay. Its change of character is accomplished by the switch springs $s^{14}$ in their opening or closing of the shunt circuit 21—22.

The wiper $w$ sweeps over a circle, as I have stated, and on this circle are arranged a number of contacts corresponding to the number of lines to be served by the switch. In most cases, where not exceeding 100 lines are assigned to a position. I shall have a switch for each cord circuit at each position, and all the switches at each position will be capable of serving all the lines. It is desirable, however, to keep down the number of line contacts in the multiple banks, certainly to 100 if possible, for the reason that I desire a one-movement switch, and more than 100 contacts in either a circle or an arc are difficult to handle, although of course not impossible. Hence, where more than 100 lines are assigned to a position I shall have more than one set of switches and registers per position, each serving a portion of the total number of lines at the position.

Further points in the construction and connection of my switch and register will be apparent from the statement of operation.

Suppose subscriber A calls: current flowing in the line circuit 1—2 energizes the line relay L, and this closes the local circuit of the signal lamp $l$, which glows. The operator inserts a plug P in answer to the call, and thereby completes the following circuit to the cut-off relay: B, 10, 18, R′, $x$, 7, P, J, 4, L′, 9, ground, and back to battery. She also simultaneously closes the following branch circuit: B, 10, 16, R$h$, 11, 14, M, 17, 7, P, J, 4, L′, 9, ground. In other words, the bridge is connected, as to the two arms from battery B, and as to the third arm through the jack, but the fourth arm—11, 90,—is still incomplete. The bridge being thus unbalanced, current flows through the bridge wire 14—17 and the magnet M, whose armature is attracted, closing the following circuit: B, 10, 150, 15, 22, $s^{14}$, 21, M′, ground and back to battery. Magnet M′ becoming energized by current in this circuit pulls up its armature $m^5$ and $m^6$, which does three things: first, armature $m^5$ connects wire 20 from the commutator I, to the wire 19, whereby current from the battery B passes in intermittent pulses to the magnet $M^2$, which is the stepping magnet and proceeds to turn the spindle $s$; second, the armature $m^6$ leaves its back contact, which cuts off the restoring or release magnet $M^3$, third, the armature $m^6$ closes on contact $m^7$, which connects the wire 15 direct with the winding of magnet M′, so that even after the contacts $s^{14}$ have opened, owing to the starting of the switch spindle, the magnet M′ remains under the control of the relay M and is energized until the latter loses its current. The magnet $M^2$ now steps around the switch spindle until the wiper $w$ rests on the contact $m$ of the wire 90 leading to the jack of the line in whose jack the plug P has been placed. At that instant the bridge is short circuited by the completion of the arm 11—90, and the magnet M instantly becomes inert. Its armature falling back breaks the circuit 150, 15, to magnet M′, and the latter becomes deënergized; whereupon its armatures becoming retracted, the pulsatory current circuit 20 is disconnected from magnet $M^2$, the contact $m^6$—$m^7$ is broken, (thereby cutting off the magnet M′ until the springs $s^{14}$ are again closed), and the magnet $M^3$ is again connected to the wire 15, to remain so until the switch has been restored. The circuit 12 of the printing magnet $s^4$ passes to and is under the control of the called subscriber's supervisory relay, $R^2$, in every case. When that subscriber answers, his relay $R^2$ pulls up, and while the lamp $l^2$ goes out, the circuit of the magnet $s^4$ is closed as follows: B, 10, 18, $r^2$, $r$, 12, $r^6$, 12, $s^4$, ground back to battery. It will be observed the circuit passes through a pair of springs $r^6$, controlled by a plunger or key $r^4$, latched when down by a magnet armature lever $r^5$ controlled by magnet $R^4$, connected in a local circuit in parallel with the lamp $l^2$. This push key control is to permit the operator to recall a party who has prematurely left the telephone without making another charge, or to remit any charge in a particular case. I much prefer to omit this key, for two reasons, but in some exchanges it is demanded. The first reason is that it distracts the operator and destroys the absolute secrecy and automatic character of the registering thereby; and the second is that the operator acquires a control over the charges which prevents the count being absolutely reliable. Accident or design may cause the button to be pressed when a charge should be made, and as no complaint would follow such an action no matter how frequently repeated, no tracer would be possible. On the other hand, the number of times a called subscriber would be recalled without proper charge is such a small percentage of the whole as to be negligible, and render the special key unnecessary. Still, as I have said, some managers demand such a control, so I have provided it. The switch having selected the contact of the calling line, and stopped thereon, by this act the number of the line on the wheel $s^4$ is brought opposite the tape $s^{11}$, in printing position. When the called subscriber answers, the magnet $s^4$ is energized by current sent over the circuit 12 when the armature $r$ of the supervisory relay pulls up, and the platen $s^3$ is forced against the tape and the latter against the type wheel, printing the number of the line calling on the tape.

It often happens that the calling subscriber may make what is commonly called a "recall", that is he may signal the operator by flashing the supervisory lamp that he wants another connection. In that case she would merely pull the calling plug P′ leaving the answering plug P in the calling jack, and inserting the mate in the now wanted jack. For such recalls my invention is well adapted. The register switch simply remains set, while the number is repeated when the newly called subscriber answers, and so on *ad infinitum*. I should also state here that during the conversation, if the time feed of the tape is employed, as referred to hereinbefore, the result will be a space of blank tape after the number, the length of which will give the time of connection, provided the rate of feed is known. This being maintained constant I provide the tape with cross lines spaced apart so as to indicate units of time convenient for reading, say 30 seconds. In Fig. 5 I have shown a small piece of tape on which the record of three calling numbers appears. No. 4618 had the cord circuit for 30 seconds after he got his party, No. 4677 had it a minute, and No. 4688 had it 30 seconds or more. The space $s^{100}$ following the number 4618 shows the 30 seconds, and the space $s^{110}$ shows one minute. In addition to the number of the line calling, I have shown other information printed on the tape in Fig. 5, and adapted to be printed by type in Figs. 2 and 3. In each figure a separate body $s^{120}$ carries the number of the operator. Each operator has means to set this for her own number. Thus the tape shown bears the number 19 after two calls, and 24 after the other, showing that after the first two calls operator No. 19 was relieved and replaced by No. 24 at the position to which this register was assigned. The details of this arrangement are not illustrated, as it is not claimed herein, but is made the subject of claims in my copending application filed April 15, 1905, Serial No. 600,279. Each position, of course, at the switchboard, is indicated by a general number put on all the tapes thereat, and the cord circuit registers may each identify its own tape by a characteristic general mark, it being unnecessary to mark every call with the same unless the tapes are to be cut up. This cutting up is practised sometimes to facilitate the making up of accounts and auditing. All calls are cut up, and all the pieces bearing one number are pasted together without overlapping, on a thin foundation strip. Hence each composite strip will give the total number of calls, or if time feed has been employed, the time and the number of calls, and if in addition it is desired to have the number of the cord circuit used for each connection, then another wheel or plate like $s^{200}$ must be provided at the type wheel, with the cord circuit number to which it belongs.

In Fig. 2 I have shown a modification wherein only the units and tens numerals are changed; the hundreds and thousands remaining fixed, as these are the same for all lines in one position, within limits.

In Fig. 4 I have shown removable type units, used for the following reason. It often happens that in redistributing lines at the intermediate distributing or cross-connecting frame, lines with widely different numbers are brought to the same panel of answering jacks for answering. To use the numbers appertaining to those particular jacks in registering would be possible, but if the line numbers were really different, although connected to those jacks, a translation by the bookkeeper would be necessary, with attendant trouble and expense. By the simple expedient of making the type removable, I enable the number of a line in the registers to be changed when the line is changed, thus always printing the real numbers. In Fig. 4, I have shown the type dovetailed in slots cut across the face of the wheel. They can be made a tight fit and tapped in with a small mallet, no fastening being required. Another purpose is subserved by this construction, viz. that of replacing broken type. In the figures I have shown the type direct and not reversed on the wheel, this being because an inking ribbon $s^{30}$ is shown next the platen, thus printing the same direction as the type. This is a detail, however, open to choice.

To return to the operation, suppose now that subscriber A′ having been connected, hangs up his receiver first: his supervisory relay lets go its armature, the printing magnet $s^4$ lets go and the paper tape is fed. When the calling subscriber hangs up also the operator pulls the plugs. The bridge is immediately unbalanced, for the arm 7—4 is broken, and current passes the magnet M by the following path: B, 10, 18, R′, 17, M, 14, 11, 90, L′, and ground. Current also passes through the branch 16, but as the battery supply is limited therein by suitable resistance the magents R′ and M′ are fully energized and M pulls up its armatures again. As the switch S is away from normal, the springs $s^{14}$ are open, and the armature $m^6$ being back, the magnet M′ is of course cut off. The release magnet $M^3$ is in circuit, however, so its circuit is immediately closed as follows: B, 10, 150, 15, $m^6$, $M^3$, and ground. This releases the spindle $s$, and the spring $s^{12}$ carries it back to normal. As soon as the contact $w$—$m$ is broken the magnets R′ and M lose current and let go their armatures, the operator getting a clearing out signal for the register, as a sign also of the record being made, by the extinguishing of the lamp $l'$, which stays lighted after the plugs are pulled until the register is restored. When the armature $m^4$ of the restoring magnet pulls up it lifts the armature $m^3$ through the extension or finger $m^{43}$, so as to clear both armature pawls from the ratchet.

The reason I connect the tap 90 to a point on wire 4 between the relay L′ and the jack is that thus the relay winding L′ may be brought into series with both the cord and register connections.

It will be observed that in the two-wire system here shown there is a double feed of current through wires 10 and 16 to the side 4 of line, and the magnet L′ of the cut-off takes current through the coils R′ and R$h$ in parallel. The supervisory relays are usually wound to about 100 ohms, and in order to avoid any overplus of current, a resistance $x$ may be inserted in series with the relay R′, the resistance of the winding R$h$ being made less than the sum of the resistances R′ and $x$. In actual practice under conditions existing when a number of line multiples of switch S are busy, the short-circuiting of the controlling relay M over the path 11, $w$, $m$, 90, 4, contacts of plug P and 7, becomes the testing condition rather than equality of potentials, just as in case of that modification of my system disclosed fully in Fig. 6. Under these conditions it is preferable that the resistances of the coils R$h$, and (R′, $x$) are not made precisely equal, but that they are made on the other hand sufficiently different to prevent the controlling relay M from operating on anything but the short-circuit aforementioned. This phase of the operation is fully described hereinafter in connection with Fig. 6.

I have found in practice that the arm 16 of the bridge can be omitted in many cases without impairing or changing the operation, provided the other connections are made as indicated in Fig. 6. The true bridge having been thus mutilated, it does not longer operate truly according to the Wheatstone bridge principle, but depends for control primarily upon the short-circuiting of the control magnet M. The connections of this mutilated bridge are shown separate only for convenience in illustrating, being neither more nor less than running the wire 16 through a pair of contacts $S^{140}$ operated with the switch contacts $s^{14}$ to be opened when the switch starts. The operation under such circumstances is as follows: The circuit of magnet M is normally complete from the battery to the cord strand 7 in parallel with the relay R′. When the plug P is inserted in answer to a call current flows through both these relay magnets to and through the cut-off relay L′ and ground. The switch starts as soon as magnet M′ gets current, and the wire 16 is of course severed. As soon as the switch starts however, the wiper $w$ comes on a contact $m$ of some line, no matter what, and I make these contacts so that the wiper makes contact with the succeeding line terminal before leaving the one over which it is passing. As all these are grounded through their cut-off relays, the magnet M continues to get current continuously as long as the wiper is passing over contacts of other lines than that with which its cord circuit is connected. As soon as the right line is reached, however, a dead short circuit around the magnet is closed as follows: wire 10, 18, relay R′, wire 17, 7, plug P and jack J, wire 4, 90, 11 and 14. The magnet M then loses current entirely, and the switch stops. When the plug is finally pulled out of jack J the short circuit is of course broken and magnet M again gets current, the restoring of the switch then proceeding as already described.

Many other changes and variations can be made in the system without departing from the spirit of the invention. I do not limit myself to the use of a bridge, for instance, nor to any particular type of switch, the conditions being satisfied if controlling magnets are placed in operative condition after a plug is inserted and before the line terminal $m$ is reached, and in a different condition after conjunction of the wiper and line terminal. All such arrangements fall within the scope and purview of my invention.

Although the circuits herein described are those of a common battery manual system, it will be obvious to those skilled in the art that my invention can be applied to other types of systems, such as magneto-manual, automatic or semi-automatic, without essential changes, the actual points and method of connection being determined in every case by the nature and type of the line terminals and connective apparatus.

In applying the invention to automatic systems, the rules to be observed are simple. The wire 90 must always lead to some point on a line-identifying circuit, and the wire 11 must be a part of the register control circuits.

As I have already explained additional inscriptions may be made of these or other matters to be recorded, simply by adding as many of the auxiliary type-wheels or surfaces $s^{100}$ and $s^{200}$ as may be required. For a complete record I contemplate using the following types, whose arrangement will be perfectly apparent from the foregoing description, arranging them to print in the order named:

1. Designation of the exchange.
2. The line number.
3. The party's number or letter.
4. The operator's number.
5. The section or position number.
6. The cord-circuit number.
7. The year, month and day (preferably by numerals).
8. The hour (a. m. or p. m.) and minute.

All the above are fixed type, except Nos. 2, 3, 4, 7 and 8.

In regard to the operator's disabling key $r^4$, I have shown this as held by the latch $r^5$, and released in one movement. With this arrangement the button must be held down until the subscriber answers, otherwise, the armature $r$ being back, it would release at once and print when the subscriber answered. To enable the operator to press this button at any time, and leave it, the release should be by two steps, like the escapement of the side switch in the Strowger system. A number of arrangements may be adapted for this purpose, being well known to those skilled in the art.

Having thus described my invention, what I claim and desire to secure by Letters Patent is:

1. In a telephone system, subscribers' lines terminating in jacks, cord-circuits terminating in plugs, and call registers less in number than the lines, each call register having a controlling magnet connected with a cord-circuit on one side, and with a switching device on the other, contacts connected to branches from the various line jacks, a numeral selector and register device connected with said switching device and controlled thereby so that when the switch rests upon the contact associated with a particular line the number of that line will be in position to register, and battery connections such that the controlling magnet starts the switching device when a plug is inserted in a jack, but has its condition changed when the switching device has selected the contact of that particular line, substantially as described.

2. In a telephone exchange system, a plurality of subscribers' lines each having a terminal jack, a connecting cord-circuit terminating in a plug, a register having a controlling relay connected on one side to the cord-circuit and on the other to a switch arm in the register, branch wires connected from the respective line jacks to contacts in said register, a stepping magnet and a release magnet adapted to be alternately worked by said control relay according to the position of the switch and register, battery connections such that the controlling magnet is disabled when the register switch is on the contact corresponding to the line in whose jack the plug is inserted and means to register the connection controlled through the cord-circuit by a subscriber, substantially as described.

3. In a telephone system, a plurality of lines, and a printing register therefor comprising a setting spindle, a selector magnet for turning the spindle, controlling means therefor associated with the lines, a type wheel moved by the spindle and magnet, printing mechanism controlled by a printing magnet, a record tape for said mechanism, a tape feed governed by the printing mechanism, and a controlling magnet or relay and a switch actuated in alternating energizations of said controlling magnet to render the register active and to disable it, substantially as described.

4. In a telephone exchange system, a plurality of subscribers' lines having connective terminals, a plurality of connective circuits less than the number of lines and provided with coöperating terminals for interconnecting the lines, in combination with a register system comprising a plurality of registers associated with the connective circuits and adapted to be brought into correlative line-identifying position in the use of said connective circuits, with means separately controlled after a connection is complete to record the same, substantially as described.

5. In a telephone system, a plurality of line circuits, and a plurality of connective circuits less in number than the number of lines, in combination with a register system comprising registers and means for setting the same to identify the lines in the use of the connective circuits, together with means controlled by the subscribers through the telephone lines for determining the final registering or recording acts, substantially as described.

6. In a telephone system, a plurality of subscribers' lines, a number of connective circuits therefor, and a register normally out of connection with the lines, means for starting up and driving the register in the act of making a connection with a line, means to stop the register in position to identify the line, and means under the control of a subscriber for thereafter actuating the register to record the call, substantially as described.

7. In a telephone system, subscribers' lines and means for interconnecting the same for conversation, in combination with a register system comprising the following instrumentalities: relatively fixed contacts and a relatively movable contact, branch circuits associated with the lines and connected to said fixed contacts, line identifying means associated and moving with the movable contact, electromagnetic operating means for said movable contact, a normally incomplete operating circuit adapted to be completed in making connection with a line for talking purposes, and disabling means for the electromagnetic operating means adapted to arrest the movable contact when it reaches the fixed contact connected with the branch associated with the aforesaid line, substantially as described.

8. In a telephone system, a plurality of subscribers' lines, a plurality of connective circuits therefor, and a telephone register having a plurality of contacts associated with the lines, a movable contact individual to the register, a line identifying means connected to and operated with the moving contact, a register actuating circuit controlled in the use of a connection, and separate controlling means for determining the final act of registration after a line has been identified and the register thereby prepared for making a record thereof, substantially as described.

9. In a telephone system, subscribers' lines, connective circuits, register circuits composed in part of branches associated with the connective circuits, and in part of branches associated with the line circuits, and means becoming operative in connecting with a line to match the branches associated with said line and with the connective circuits through a particular register, and thereby to identify the line and select its number for purposes of recording, together with means controlled by the called subscriber for determining the registering acts, substantially as described.

10. In a telephone exchange system, a plurality of subscribers' lines and connective circuits therefor, in combination with a register device comprising a selector switch and a printing wheel, a number of contacts in the switch connected to lines available for calling purposes, a number of characters on the printing wheel corresponding with the said contacts and movable to come into printing position simultaneously with the closing of the switch on the corresponding contacts, and means controlled by a subscriber for printing the number set up by the printing wheel, substantially as described.

11. In a telephone system, a plurality of line circuits with a register therefor having connections to the respective lines and comprising a type printer, a printing platen and magnet, means for moving the type printer to bring a desired line designation into printing position, and means to close the circuit of the printing magnet during use of the line called, substantially as described.

12. In a telephone system, a plurality of line circuits, with connections to a recorder, the same comprising a printing register and a selector, the latter determining the line calling, and the former recording its number when the called subscriber responds, substantially as described.

13. In a telephone system, subscribers' lines and connective circuits therefor, a register for said lines comprising a number wheel and a selector, with line connections for the selector, means whereby the latter controls the number wheel to set it to the proper number, and means for printing the number only when two subscribers are connected with both lines completed for conversation, substantially as described.

14. In a telephone system, a plurality of line-circuits, and a telephone register therefor comprising a selector for determining the line calling, and means for recording the indication of the selector, upon the response of the called subscriber, substantially as described.

15. A register system for telephone systems comprising branch wires and switch terminals therefor connected to jack contacts of the various lines in the exchange, a register selector having a controlling circuit connected to a cord conductor and adapted to be brought into connection with the said branch wire of a line when the cord is connected with that line by the insertion of its plug in the line jack, means for supplying current to said controlling circuit through the cord connection, a register switch arm adapted to sweep over the said switch terminals when connection is made with a line, the arrangement being such that when the switch arm comes upon the contact corresponding to the line connected, a short circuit for the controlling circuit is established and the selector stops; together with recording means set to the number of the line connected by the action of the selector, and actuated to record by the action of the called subscriber, substantially as described.

16. In a telephone exchange system, a call register adapted to be associated with a line by the act of making connection therewith for conversation, means in said register to thereupon select and identify the line, a controlling magnet for said register, and a circuit for said magnet controlled at two points, one a contact in the connective apparatus, and the other a contact in the register mechanism, the latter being controlled by the register in selecting and identifying the line, substantially as described.

17. In a telephone exchange system, subscribers' lines, connective apparatus therefor, and call registering apparatus common to a number of lines and associated with and controlled through the connective apparatus so as to be brought into operation only when lines are connected for conversation, substantially as described.

18. In a telephone exchange system, a call register comprising one or more type surfaces, a record surface coöperating therewith, means operable in the use of the connective apparatus in its several steps, to set the type so as to properly indicate the data of any given connection, and means controlled by the called subscriber to print from the type when set, substantially as described.

19. In a telephone exchange system, subscribers' lines and connective circuits therefor, a register associated with said lines, means to set the register in correlative indicating position with a line with which connection is made, means operating when the lines are completed for conversation to record a call, and means for rendering said recording means inoperative.

20. In a telephone exchange system, subscribers' lines and connective circuits therefor, a register associated with said lines, means to set the register in correlative indicating position with the calling line, means operated by an act on the part of the called subscriber when connection is made to print the indications set up by the register, and means associated with the connective circuits for rendering the printing means inoperative, substantially as described.

21. In a telephone exchange system, subscribers' lines and operators' connective circuits therefor, a register associated with said lines, means to set the register in correlative indicating position with respect to the called line, means forming a part of the connective circuits and controlled by the called subscriber when connection is made for printing the indications set up by the register, and means associated with the connective circuits and controlled by the operator to render said last named means inoperative, substantially as described.

22. In a telephone exchange system, subscribers' lines and operators' connective circuits therefor, a register associated with said lines, means to set the register in correlative indicating position with respect to the called line, a printing magnet for printing the indications set up by the register, signal means controlled by the called subscriber and controlling said magnet so that the printing operation is effected by an act on the part of the called subscriber, and means controlled by the operator for preventing a reprint of the indication when a recall is desired, substantially as described.

23. In a telephone exchange system, subscribers' lines and terminal connective devices therefor, means for distributing the lines among said connective terminal devices for the purpose of initiating connections, without regard to the numbers by which the lines are known; call registers each having a number of line indications comprising those of lines associated with certain parts of the connective terminal apparatus, and means to change and adjust said register indications in accordance with changes in the terminal connections of the corresponding lines, substantially as described.

24. In a telephone exchange system, a plurality of subscribers' lines and a plurality of connective circuits in combination with a register normally dissociated from the lines, means for starting up and driving the register in the act of making a connection with the line, means for rendering said driving means inoperative with the register in position to identify the line, and means associated with the connective circuits and under control of a subscriber for thereafter actuating the register to record the call, substantially as described.

25. In a telephone system, a plurality of subscribers' lines and a number of connective circuits therefor, in combination with a register normally dissociated from the lines, means controlled in the act of making a connection with the line for driving said register step by step, means to render said driving means inoperative at a point where the register will be in position to identify the line, and means associated with the connective circuits and under the control of a subscriber for thereafter actuating the register to record the call, substantially as described.

26. In a telephone system, a plurality of subscribers' lines and a number of connective circuits therefor, in combination with a selector switch normally dissociated from the line, means operating in the act of making a connection with the line for driving said switch, an indicating device controlled by said switch, means to stop the movement of the switch so that the indicating device will be in position to identify the line, a printing magnet and a circuit therefor, and means under the control of the called subscriber for completing the circuit of said printing magnet whereby said magnet is actuated to record the call, substantially as described.

27. In a telephone system, the combination with a plurality of subscribers' lines and a number of connective circuits therefor, in combination with a registering system which comprises the following instrumentalities; relatively fixed contacts and a relatively movable contact, branch circuits associated with the lines and connected to said fixed contacts, line identifying means associated and moving with the movable contact, operating means for said movable contact, controlling means therefor, a nomally incomplete circuit for said controlling means adapted to be completed for making a connection with the line, disabling means for said operating means adapted to arrest the movable contact when it reaches the fixed contact connected with the branch associated with the aforesaid line, and means also under control of the controlling means for returning said movable contact to normal, substantially as described.

28. In a telephone system, subscribers' lines and a plurality of connective circuits therefor, a register associated with said lines, means to set the register in indicating position with respect to the calling line, means to print the indications set up by the register, means associated with the connective circuits for rendering said printing means inoperative, means for locking said last named means in operating position, and means controlled by the called subscriber for releasing said locking means, substantially as described.

29. In a telephone system, a plurality of line circuits, and a plurality of connective circuits less in number than the number of lines, in combination with a register system comprising registers, and means for setting the same to identify the lines in use with the connective circuits, said register system operating through and in conjunction with the connective circuits, together with means forming a part of the connective circuits and controlled by the subscriber through the telephone lines for determining the final registering or recording acts, substantially as described.

30. In a telephone system, a plurality of circuits, and a plurality of connective circuits less in number than the number of lines, in combination with a register system comprising registers, and means for setting the same to identify the lines in use with the connective circuits, said register system operating through and in conjunction with the connective circuits, means forming a part of the connective circuit for determining the final registering or recording acts, and means under control of the operator for rendering said last named means inoperative when a recall is desired, substantially as described.

31. In a telephone exchange system, subscribers' lines, connective apparatus therefor, call registering apparatus common to a number of lines for selectively recording a call, said call registering apparatus being controlled for selection through said connective apparatus, and for recording through a subscriber's line.

32. In a telephone exchange system, subscribers' lines, link circuits for interconnecting the lines, call registering apparatus common to a number of lines and adapted to be actuated to selectively register a call from any of said lines, when connected.

33. In a telephone exchange system, a plurality of line circuits, link circuits coöperating with line talking terminals for purposes of interconnection, and call registering apparatus associated with the link circuits and containing separate testing terminals of the lines, with connections whereby a calling line is selected and the call registered without interfering with the talking circuit.

34. In a telephone registering system, subscribers' lines and central office connective circuits, a register switch associated with the latter and having contacts associated with the former, means for automatically starting said switch when connection is effected with a subscribers' line and moving the same until it makes connection with its corresponding line terminal, a printing wheel connected with the switch to be turned during the operation thereof to bring the number corresponding to the connected line into printing position, means to print said number, and means to disconnect the switch as regards its connection with the line or associated circuits when the connective circuits are idle, substantially as described.

35. In a telephone registering system, subscribers' lines and central office connective circuits, a register switch associated with each of the latter and having contacts associated with the former, means for automatically starting said switch when connection is effected with a subscriber's line and moving the same until it makes connection with its corresponding line terminal, a printing wheel connected with the switch to be turned during the operation thereof to bring the number corresponding to the connected line into printing position, means to print said number, and means to disconnect the switch as regards its connection with the line or associated circuits when its connective circuit is idle, substantially as described.

36. A telephone registering system comprising an automatic selector switch and an associated register, together with circuit connections whereby said switch will automatically select a connected line, and the register will record the designation thereof, substantially as described.

37. A telephone registering system comprising an automatic selector switch and an associated register, together with circuit connections whereby said switch will automatically select a calling line, and the register will record the designation thereof, substantially as described.

38. A telephone exchange system having a plurality of lines and means for interconnecting them, together with registers less in number than the number of lines and comprising actuating means operable upon initiating a connection between two lines and registering means operable when the connection is complete and effected, substantially as described.

39. A telephone register in combination with a plurality of lines, comprising means for producing a record, and means responsive to consecutive calls to produce successive action, said register being actuated jointly by an operator and the called subscriber for each connection, substantially as described.

40. A telephone registering system comprising an automatic selector switch containing line-identifying terminals and a wiper coöperating therewith, a register associated with the switch, means to actuate the switch and register in making a connection, to select the line connected, means to record the call on the register charged to the line selected, and means to indicate the operator or connective device through whom or which the connection was effected, substantially as described.

41. A telephone registering system comprising an automatic selector switch containing line-identifying terminals and a wiper coöperating therewith, a register associated with the switch, means to actuate the switch and register in making a connection, to select the line calling, means to record the call, and means brought under the control of the subscriber called to charge the call to the line calling when the connection is completed and the call is answered, substantially as described.

42. A telephone registering system comprising an automatic selector switch containing line-identifying terminals and a wiper coöperating therewith, a register associated with the switch, means to actuate the switch and register in making a connection, to select the line calling, means to record the call, and means brought under the control of the subscriber called in completing the connection, to determine whether or not the call shall be charged, substantially as described.

43. In a telephone registering system, subscribers' circuits and central office circuits and a register associated with the latter, means to set and actuate the register when connection is effected between lines, and means under the control of an operator to register the identity of the operator, substantially as described.

44. A telephone registering system comprising a register common to a plurality of lines, means associated with the register and actuated in initiating a connection with the calling line to determine the line calling, and means controlled in completing the connection to determine whether the call shall be charged or not, substantially as described.

45. A telephone register comprising actuating means automatically operable upon initiating a connection to select and identify the line with which connection is made, and coöperating registering means operable only when the called subscriber answers, substantially as described.

46. A telephone registering system comprising in combination, a register common to a plurality of lines, said register having means actuated by a calling subscriber for registering his number, and means actuated by the called subscriber for recording an answered call, with means actuated by the operator for registering the operator's number.

47. A telephone register common to a plurality of lines and adapted to record the numbers of connections made, and comprising means wherethrough it is controlled jointly by the called subscriber and by the operator.

48. In a telephone exchange system, subscribers' lines, means for interconnecting them, and a recorder for a plurality of lines comprising a frame, a series of line terminals mounted on said frame, a spindle and switch-arm supported in the frame and coöperating with said terminals to select the line calling, a printing wheel having numbers corresponding to the line terminals and each adapted to come into printing position when connection has been made with its line terminal, and a printing magnet having a platen adapted to print but one number at a time, substantially as described.

49. In a telephone exchange system, a plurality of lines, means for interconnecting the same, and a recording system therefor, comprising a selector switch having a spindle carrying a type wheel and a contact arm, a set of contacts in operative relation to said switch-arm, each contact associated with a particular line and so connected as to have its electrical condition changed when connection is effected with its line, a motor for the switch, a starting relay associated with connective apparatus and adapted to be energized when connection is effected with a line, said starting relay controlling the motor, together with means for stopping the motor when the switch-arm touches the contact associated with the calling line.

In testimony whereof I affix my signature in presence of two witnesses.

EDWARD E. CLEMENT.

Witnesses:
T. P. TARBOX,
JAMES H. MARR.